United States Patent
Banerjee

(10) Patent No.: US 8,202,344 B2
(45) Date of Patent: Jun. 19, 2012

(54) CEMENTED CARBIDE WITH ULTRA-LOW THERMAL CONDUCTIVITY

(75) Inventor: Debangshu Banerjee, Springdale, AR (US)

(73) Assignee: Kennametal Inc., Latrobe, PA (US)

( * ) Notice: Subject to any disclaimer, the term of this patent is extended or adjusted under 35 U.S.C. 154(b) by 1065 days.

(21) Appl. No.: 11/751,360

(22) Filed: May 21, 2007

(65) Prior Publication Data

US 2008/0292737 A1    Nov. 27, 2008

(51) Int. Cl.
C22C 29/08 (2006.01)
C22C 29/10 (2006.01)
(52) U.S. Cl. .......................... 75/236; 75/242
(58) Field of Classification Search ............... 75/236, 75/242

See application file for complete search history.

(56) References Cited

U.S. PATENT DOCUMENTS

| | | | |
|---|---|---|---|
| 2,731,710 A * | 1/1956 | Lucas et al. | 75/242 |
| 2,942,971 A * | 6/1960 | Wellborn | 419/15 |
| 3,490,901 A * | 1/1970 | Takeji | 75/241 |
| 3,993,446 A * | 11/1976 | Okawa | 75/240 |
| 4,046,517 A | 9/1977 | Soga | |
| 4,270,952 A | 6/1981 | Kobayashi | |
| 4,341,557 A | 7/1982 | Lizenby | |
| 4,428,906 A | 1/1984 | Rozmus | |
| 4,656,002 A | 4/1987 | Lizenby et al. | |
| 4,744,943 A | 5/1988 | Timm | |
| 4,778,521 A * | 10/1988 | Iyori et al. | 75/237 |
| 4,923,512 A | 5/1990 | Timm et al. | |
| 5,736,658 A * | 4/1998 | Mirchandani et al. | 75/236 |
| 6,521,353 B1 | 2/2003 | Majagi et al. | |

FOREIGN PATENT DOCUMENTS

| | | | |
|---|---|---|---|
| JP | 57-16143 | * | 1/1982 |
| JP | 05-098382 A | | 4/1993 |

OTHER PUBLICATIONS

Xiong Ji et al. The effect of WC, Mo2C, TaC content on the microstructure and properties of ultra-fine TiC0, 7N0.3 cermet, Materials & Design, 2007,vol. 28, pp. 1689-1694 See the abstract; tables 2, 3; and Results and discussion.

Kelto, C.A., "Rapid Omnidirectional Compaction", Metals Handbook, 1984, pp. 542-546, vol. 7, American Society for Metals, U.S.

* cited by examiner

Primary Examiner — Roy King
Assistant Examiner — Ngoclan T Mai
(74) Attorney, Agent, or Firm — Matthew W. Smith, Esq.

(57) ABSTRACT

A hard alloy material comprising tungsten carbide in an amount of less than 50 weight percent of the material, titanium carbide in an amount of at least about 30 weight percent, and a binder material of cobalt and nickel. In other aspects of the invention, molybdenum and/or chromium are included to further lower the thermal conductivity of the material. The thermal conductivity of the material of the invention is about 12 Watt/m° K. or less.

19 Claims, 3 Drawing Sheets

CEMENTED CARBIDE WITH ULTRA-LOW THERMAL CONDUCTIVITY

FIELD OF THE INVENTION

The present invention relates to the field of wear resistant materials and, in particular, to a low thermal conductivity cemented carbide for use in pelletizing die faces and the like.

BACKGROUND INFORMATION

Pelletizing is a process for producing a uniform particle size of newly produced or recycled plastic resins. The petroleum industry uses this process to produce pelletized polyethylene, polypropylene, and other polymeric materials with filler materials in them to allow more efficient handling and processing of the materials. The pelletizing process begins with molten polymer from an extruder being forced through a die to form multiple strands of polymer resin. Typically, the pelletizing process is performed under water where the strands are cut by a rotating knife passing along the surface of the die face immediately upon exiting the die. This operation takes place in a closed environment as water circulates through to both cool the die face and to carry the pellets out of the closed environment. The pellets are then transferred to a dewatering/drying system prior to final packing or further processing.

Generally the die face of a pelletizer is formed of a different material than the body of the pelletizer or may be coated with a different material. Because most of the wear on the pelletizer occurs at the face, the use of a hard, wear resistant, and corrosion resistant die face material allows for longer life of the pelletizer. The die face material may be replaced several times before the die body must be changed. Die face materials are subject to a range of deleterious environmental conditions such as, for example, temperature extremes, submersion in a water environment, and constant surface abrasion from the flowing polymer material and movement of the cutting knives causing cavitation. In addition to being hard and wear resistant, a die face material also should have low thermal conductivity and high corrosion/cavitation resistance.

The two most common die face materials used as wear pads and orifice nibs today are ferro-titanium carbide (Ferro-TiC) and tungsten carbide cobalt (WC—Co) alloys. The wear pads and orifice nibs are embedded in a stainless steel alloy and/or a ceramic material of the die face plate. Ferro-TiC is a machineable and hardenable alloy/steel bonded titanium carbide. Ferro-TiC is typically a metal matrix composite of titanium carbide (TiC) plus chromium (Cr), molybdenum (Mo), carbon-iron alloy (C—Fe) and/or titanium. For example, a typical Ferro-TiC composition, as recited in U.S. Pat. No. 5,366,138 (Vela et al.), includes 30-32% TiC, 9-10% Cr, 3-6.5% Co, 3-4.5% Ni, 2-4% Mo, 0-1% Al, 1-2% Ti, 0-1% Cr, and 40-50% Fe. The ultra-hard, rounded titanium carbide grains are uniformly distributed throughout a hardenable steel alloy matrix. Fabrication in the annealed state is accomplished with ordinary tools and equipment, followed by conventional heat treatment to obtain maximum hardness.

WC—Co based cemented carbides include a range of composite materials which contain hard carbide particles bonded together by a metallic binder. The proportion of carbide phase is generally between 70-97% of the total weight of the composite and its grain size averages between 0.2 and 14 μm. For example, a typical cobalt bound tungsten carbide material is disclosed in U.S. Pat. No. 4,923,512 (Timm et al.). Timm et al. recites a composition having WC in an amount of 83 to 99 weight % and cobalt in an amount of 1-18 weight %. Tungsten carbide (WC), the hard phase, together with cobalt (Co), the binder phase, forms the basic cemented carbide structure. In addition to WC—Co compositions, cemented carbide may contain small proportions of secondary carbides such as titanium carbide (TiC), tantalum carbide (TaC), and niobium carbide (NbC). These secondary carbides are mutually soluble and can also dissolve a high proportion of tungsten carbide. In addition, cemented carbides are produced which have the cobalt binder phase alloyed with, or completely replaced by, other metals such as nickel (Ni), chromium (Cr), molybdenum (Mo), iron (Fe) or alloys of these elements. Thus, there are typically three individual phases which make up a cemented carbide, the α-phase of tungsten carbide, the β-phase of a binder material (e.g. Co, Ni, etc.), and the γ-phase which is a single or solid solution carbide phase (e.g., of WC and TiC, and/or TaC, and/or NbC, and/or nitrides or carbonitrides).

Ferro-TiC alloys, although generally effective in wear-resistance applications, are more expensive than comparable WC—Co alloys and are more difficult to work. For example, while WC—Co alloys can be inexpensively and easily silver soldered or brazed in air to a die body, Ferro-TiC alloys cannot be silver soldered or brazed directly to the die by conventional methods.

WC—Co materials, though having similar corrosion and wear resistance to Ferro-TiC alloys when used as orifice nibs, suffer from undesirably high thermal conductivity. High thermal conductivity leads to the freezing of the polymer in the die orifice as the orifice nib conducts heat away from the polymer being extruded, due to the cooling effect of circulating water at the surface. This is predominant when filler materials are involved, such as in polypropelene.

U.S. Pat. No. 6,521,353 to Majagi et al., which is incorporated herein by reference, discloses a hard metal comprising a major amount of tungsten carbide and a minor amount of titanium carbide which are cemented together with a binder material of cobalt and nickel.

There continues to be a need for hard metal alloy materials for use in pelletizing die faces and other high-wear applications that have ultra-low thermal conductivity comparable to ceramic materials, high wear and corrosion resistance, and are relatively inexpensive, easy to manufacture and easier to join with steel in comparison with ceramic materials.

SUMMARY OF THE INVENTION

The above needs are satisfied by the present invention which provides a hard alloy material comprising tungsten carbide in an amount less than 50 weight percent of the material, titanium carbide in an amount of at least about 30 weight percent, and a binder material of cobalt and nickel. The thermal conductivity of the material of the invention is about 12 Watt/m.K or less. In other aspects of the invention, molybdenum and/or chromium are included in the binder material to further lower the thermal conductivity and to improve the corrosion resistance of the material. In yet another aspect of the invention, additional carbides such as chromium carbide and/or tantalum niobium carbide are included in the material.

An aspect of the present invention is to provide a wear resistant, low thermal conductivity alloy comprising an alloy having a thermal conductivity of about 12 Watt/m° K. or less. The alloy comprises tungsten carbide in an amount less than 50 weight percent, titanium carbide in an amount of at least 30 weight percent, and a binder material comprising cobalt and/or nickel.

Another aspect of the present invention is to provide a low thermal conductivity hard metal composition in a pelletizing die face having a thermal conductivity of about 12 Watt/m.K or less, comprising: tungsten carbide in an amount less than about 50 weight percent, titanium carbide in an amount of at least 30 weight percent, and a binder material comprising cobalt and/or nickel.

A further aspect of the present invention is to provide a pelletizing die comprising: a die body, and a die face on a surface of said die body, said die face comprising an alloy. The alloy comprises tungsten carbide in an amount less than 50 weight percent, titanium carbide in an amount of at least 30 weight percent, and a binder material comprising cobalt and/or nickel.

These and other aspects of the present invention will be more apparent from the following description.

DETAILED DESCRIPTION

Figure 1:
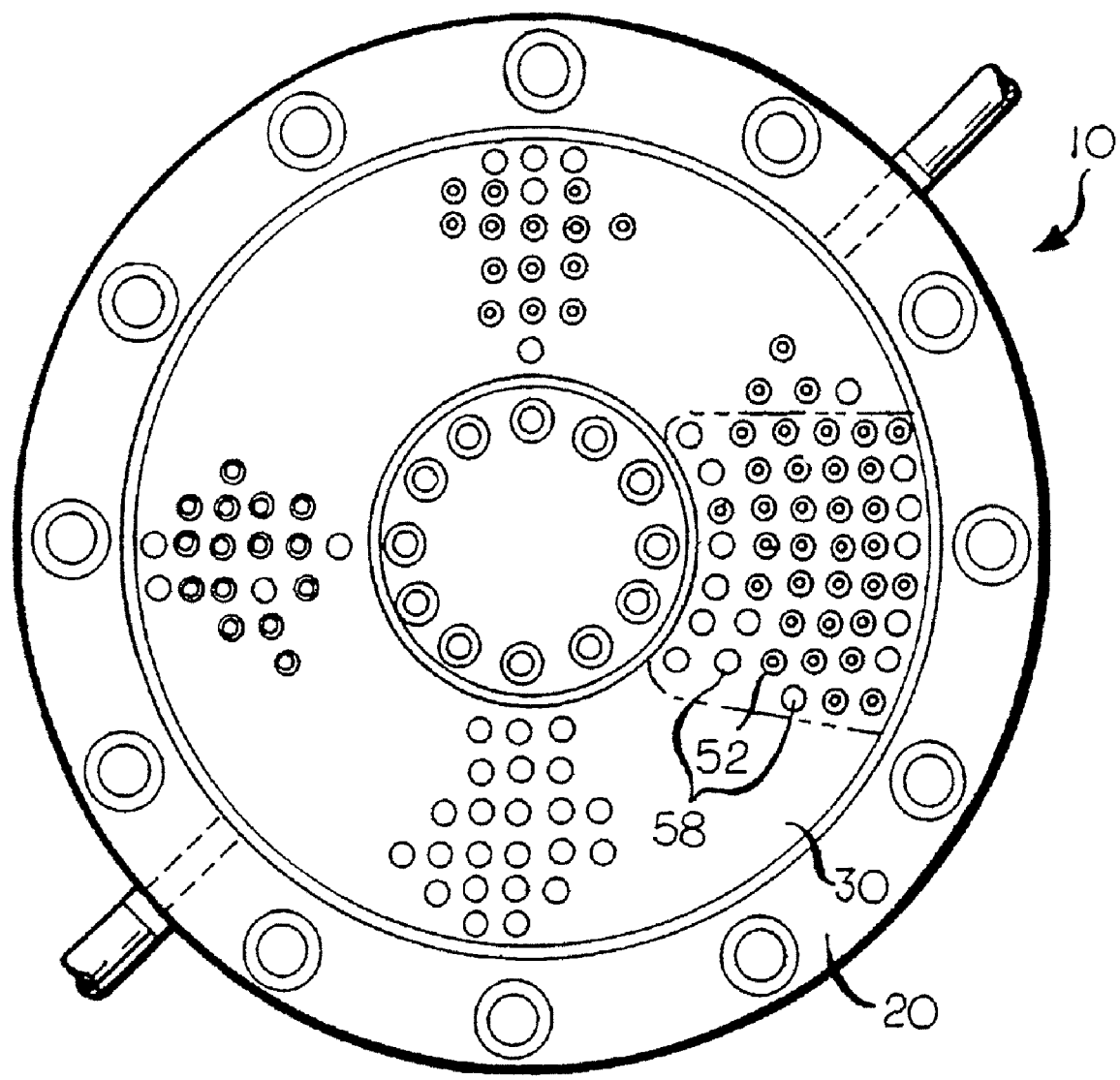
FIG. 1 is a diagram of a pelletizing die utilizing the hard metal alloy material of the invention.
Figure 2:
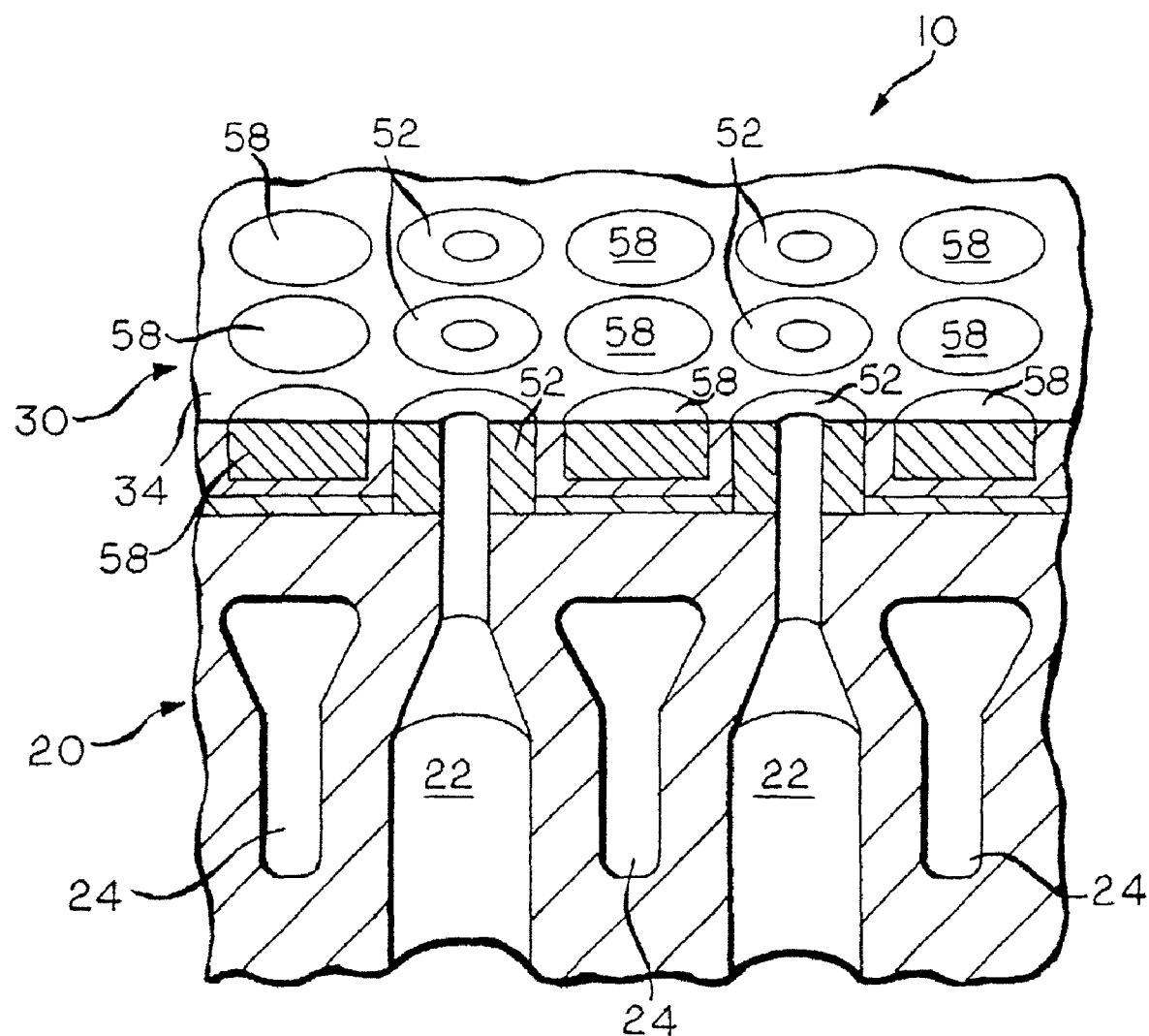
FIG. 2 is a cross section of the pelletizing die of FIG. 1.

FIGS. 1 and 2 illustrate a preferred embodiment of a die face plate 30 in use on a pelletizing die plate 10. The pelletizing die plate 10, such as that described in U.S. Pat. No. 4,856,974 (Wolf), incorporated herein by reference, has a body 20 and a die face plate 30. Die face plate 30 may be a separate replaceable article or may be a coating on the body 20 or on an article substrate having the shape of a die face plate. For example, the die face place 30 is composed of a first member 34 having embedded therein generally cylindrical orifice nibs 52 and wear pads 58. The first member 34 may be, for example, a stainless steel (e.g., 15-5 PH steel) or a thermally sprayed on alumina or zirconia based ceramic or a combination thereof. The orifice nibs 52 and wear pads 58 are attached to the first member 34 by any suitable method, such as brazing. Where the first member 34 is a ceramic as described above, there may be a layer of steel between the ceramic and the inserts 52 and wear pads 58.

The body 20 may also be a stainless steel (e.g., 15-5 PH stainless) and has extrusion orifices 22 and heating channels 24 therein. The orifices 22 also pass through the die face plate 10 and are there surrounded by the orifice nibs 52.

In a preferred embodiment, the orifice nibs 52 and wear pads 58 are sintered articles of a tungsten carbide (WC) and titanium carbide (TiC). The cemented carbide material comprises less than 50 weight percent WC, preferably from about 30 to about 45 weight percent WC, and more preferably from about 35 to about 40 weight percent WC. The cemented carbide material also comprises titanium carbide (TiC) in amounts greater than about 30 weight percent, preferably from about 30 to about 45 weight percent TiC, more preferably from about 35 to about 40 weight percent TiC. In one embodiment, the amounts of WC and TiC are substantially equal.

Limiting grain growth of the material, particularly of the WC grains, is important during processing so that small grain sizes, high hardness, high magnetic coercivity, and low porosity may be attained. To accomplish this, a grain growth inhibitor may be added. The grain growth inhibitor is preferably another carbide and can be any metal carbide, alone or in combination, such as chromium carbide, molybdenum carbide, tantalum carbide, niobium carbide or vanadium carbide. These elements form carbides or solid solution carbides with the WC in the composition. The composition preferably contains carbide and/or solid solution carbide forming elements, such as the group IVB, VB, and VIB elements, preferably Ta, Nb, Zr, Mo, and Cr alone or in combination with each other. More preferably, carbides of at least one but possibly more of the elements are present in the composition in the amounts of about 0.1 to about 5 weight percent $Cr_3C_2$, about 1 to about 8 weight percent TaC, about 0.5 to about 5 weight percent NbC (preferably by about 2-5 weight percent total of tantalum and niobium carbide), about 0.5 to about 3 weight percent ZrC and about 0.5 to about 3 weight percent $Mo_2C$. These elements preferably may be added to the mix as an element, alloy, or carbide. The carbides may also be present in any combination of one or more of the elements Ta, Hf, Zr, Mo, Cr, Nb, Ta, V and W to form a carbide or solid solution carbide. Some or all of the Cr and Mo may be present in the binder material.

Mo and/or Cr also further reduce the thermal conductivity of the die face plate 30. In addition, Mo and/or Cr improve the corrosion resistance and aid in the sintering process. Ideally, Mo is present in an amount of about 0.5 weight percent and Cr is present in an amount of about 0.5 weight percent.

The binder material preferably contains any combination of cobalt (Co), nickel (Ni) and/or alloys of either Co or Ni and, preferably, is present in the composition in amounts of from about 10 to about 30 percent of the total composition. The cobalt content is typically from about 3 to about 15 weight percent, and more preferably from about 6 to about 8 weight percent. The nickel content is typically from about 8 to about 25 weight percent, and more preferably from about 10 to about 15 weight percent.

The cemented carbide material may also include TaNbC in amounts up to 10 weight percent, typically from about 0.5 to about 5 weight percent, and more preferably from about 1 to about 3 weight percent. TaNbC reduces the tendency of galling from the local heat generated by friction of rotating knives on die face.

In another embodiment of the invention, nitrides and/or carbonitrides of any one or more of the elements of Hf, Ti, Zr, Mo, Cr, Ta, Nb and V may be included in the hard metal alloy composition, preferably in complete or partial substitution for their aforementioned carbide contents. Preferably, the composition contains nitrides of Ti and/or Zr. TiN is preferably added in an amount of about 10 to about weight percent of the composition and, more preferably, in an amount of about 15 to about 25 weight percent. ZrN is preferably added in an amount of about 0.5 to about 3 weight percent of the composition and, more preferably, in an amount of about 0.5 to about 1.0 weight percent.

A preferred process for forming the orifice nibs 52 and wear pads 58 is described below. Each component part is supplied in powder form. This powder typically contains a mixture of the component elements and compounds listed above and paraffin wax. The powder material used in the present invention is preferably fabricated by wet attrition milling of the ingredients using WC—Co balls and heptane/acetone, etc. The milling times may vary depending upon the method of milling used and the WC and TiC particle grain size desired. The milled powder may be spray dried or used in the conventional pelletized form also.

The milled powder is pressed into a desired shape, called greenware, by uniaxially pressing, cold isostatic pressing, injection molding, or extrusion and then de-waxed. De-waxing is preferably done between 50-600° C. under a vacuum/

H₂ atmosphere. Further pre-sintering may be performed at a temperature of about 600-1200° C. and under a vacuum/H₂ atmosphere.

Once the desired shape is achieved, the greenware is sintered to produce a fully dense part. Representative methods for sintering the greenware include pressureless or vacuum sintering or vacuum sintering followed by Rapid Omnidirectional Compaction (ROC) or uniaxial hot pressing. Preferably the greenware is vacuum sintering, preferably followed by a post-sintering HIP (hot isostatic press) process to further density the sintered product. The greenware is preferably sintered at a temperature of about 1360° C. to about 1480° C. in a vacuum furnace for about 20 minutes to about 90 minutes. More preferably, the sintering occurs for about 40-60 minutes. After sintering, it is often necessary to HIP the sintered part to completely close all porosity. HIP is preformed at temperatures similar to the sintering temperature but at pressures of 100 to 30,000 psi, preferably 500 to 1500 psi and most preferably about 800 psi at 1440° C. Preferably, the final porosity of the material is equal to or better than A04-B02-C00.

The greenware may also be sintered using a ROC process, various aspects of which are shown in U.S. Pat. No. 4,744,943 (Timm), U.S. Pat. Nos. 4,656,002 and 4,341,557 (Lizenby), U.S. Pat. No. 4,428,906 (Rozmus) and Kelto, Metals Handbook, "Rapid Omnidirectional Compaction" Vol. 7, pages 542-546, each of which is incorporated herein by reference. In the ROC process the porous greenware is first embedded in a pressure transmitting material that acts like a viscous liquid at the sintering temperature. The material and greenware are contained in a container or shell that has sufficient plasticity so that it will not crack or rupture during subsequent processing. To accomplish this the shell may contain a thin steel liner, for example. The greenware may be enveloped in a barrier layer such as graphite foil or boron nitride. Suitable pressure transmitting materials include glasses that have sufficient viscosity so that the glass does not penetrate the greenware under an applied pressure. Representative glasses include glasses containing high concentrations of silica and boron.

In a final manufacturing step, the sintered product is finished according to its required final finish and/or shape, by, e.g., additional grinding, lapping and/or polishing processes. For example, the sintered product of the invention may be a die face, material coupons, a coated die body, orifice nibs 52 or wear pads 58.

Preferably the orifice nibs 52 and wear pads 58 will have an average grain size after processing between 1 to 20 microns and, preferably, between 3 to 6 microns. The hardness of the orifice nibs 52 and wear pads 58 is preferably in the range from about 86 to about 93 measured on the HRA scale.

The practice of this invention is further described in the following Example.

EXAMPLE

In accordance with an embodiment of the present invention, a sample having the following nominal composition was made: 38.5 weight percent tungsten carbide; 38.5 weight percent titanium carbide; 13 weight percent nickel; 7 weight percent cobalt; 2 weight percent TaNbC; 0.5 weight percent chromium carbide; and 0.5 weight percent molybdenum.

Figure 3:
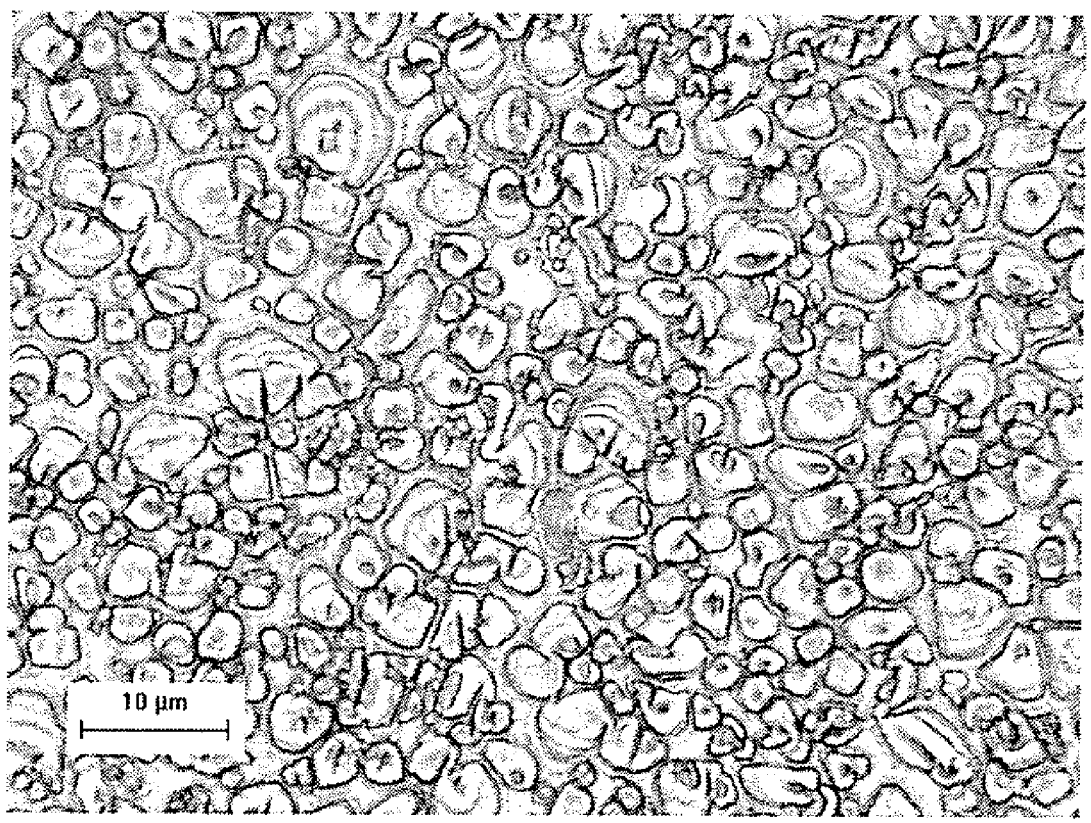
FIG. 3 is a photograph of a microstructure of one embodiment of the hard metal alloy composition of the invention.

Tables 1 and 2 show the bulk chemistry and material properties of the WC/TiC cemented carbide material in accordance with an embodiment of the invention. The bulk chemistry is that of the powder material of the invention prior to processing. The material properties are that of a coupon prepared in accordance with the invention, i.e., after densification. The microstructure of the material is shown in FIG. 3.

TABLE 1

| Nominal Chemical Composition (wt. %) | |
|---|---|
| tungsten carbide | 38.5 |
| titanium carbide | 38.5 |
| chromium carbide | 0.5 |
| nickel | 13.0 |
| cobalt | 7.0 |
| TaNbC | 2.0 |
| molybdenum | 0.5 |

TABLE 2

| Metallurgical Properties | |
|---|---|
| Ra | 88.0 ± 1.0 |
| Density | 7.75 ± 0.1 g/cc |
| TRS | 1,550 MPa |
| Porosity | A02B00C02 |
| $K_{1C}$ | 11.5 MPa·m$^{1/2}$ |
| Thermal conductivity | 12 W/m °K at RT |

The cemented carbide of the present invention has thermal conductivity at least about 10 times smaller than traditional carbide materials, and a fracture toughness and strength at least about 2 to 3 times higher than most ceramic materials. In one embodiment, the thermal conductivity of the cemented tungsten carbide is 12 W/m° K. or less at room temperature. This material can be brazed on steel using existing processes (Ni metallizing+brazing). Braze strength in excess of 5,000 psi has been reached.

The above description and drawings illustrate preferred embodiments which achieve the objects, features and advantages of the present invention. It is not intended that the present invention be limited to the illustrated embodiments. Any modification of the present invention which comes within the spirit and scope of the following claims should be considered part of the present invention.

The invention claimed is:

1. A wear resistant, low thermal conductivity alloy having a thermal conductivity of about 12 Watt/m° K. or less, said alloy comprising:
   tungsten carbide in an amount between about 30 and about 45 weight percent;
   titanium carbide in an amount of at least 30 weight percent;
   chromium carbide in an amount of from 0.1 to 5 weight percent; and
   a binder material comprising cobalt or a combination of cobalt and nickel, wherein the cobalt comprises from about 3 to about 15 weight percent of the wear resistant alloy.

2. The wear resistant alloy of claim 1, wherein the tungsten carbide is present in an amount between about 35 and about 40 weight percent.

3. The wear resistant alloy of claim 1, wherein the titanium carbide is present in an amount between about 30 to about 45 weight percent.

4. The wear resistant alloy of claim 1, wherein the titanium carbide is present in an amount between about 35 to about 40 weight percent.

5. The wear resistant alloy of claim 1, wherein the tungsten carbide and titanium carbide are present in substantially the same amounts.

6. The wear resistant alloy according to claim 1, comprising from about 10 to about 30 weight percent of the binder material.

7. The wear resistant alloy according to claim 6, wherein the nickel comprises from about 8 to about 25 weight percent of the wear resistant alloy.

8. The wear resistant alloy according to claim 6, wherein the cobalt comprises from about 6 to about 15 weight percent of the wear resistant alloy.

9. The wear resistant alloy of claim 1, further comprising at least one additional carbide or solid solution carbide.

10. The wear resistant alloy of claim 9, wherein said at least one additional carbide or solid solution carbide is selected from the group consisting of tantalum carbide, niobium carbide, zirconium carbide and molybdenum carbide.

11. The wear resistant alloy of claim 1, wherein said binder material further includes at least one element selected from the group consisting of Mo and Cr.

12. The wear resistant alloy of claim 1, wherein the wear resistant alloy has a hardness of at least 88 HRA.

13. The wear resistant alloy of claim 1, wherein the wear resistant alloy is used as an insert in a pelletizing die face.

14. A low thermal conductivity hard metal composition in a pelletizing die face having a thermal conductivity of about 12 Watt/m° K. or less, comprising:

tungsten carbide in an amount between about 30 and 45 weight percent;
titanium carbide in an amount of at least 30 weight percent;
chromium carbide in an amount of from 0.1 to 5 weight percent; and
a binder material comprising cobalt or a combination of cobalt and nickel, wherein the cobalt comprises from about 3 to about 15 weight percent of the low thermal conductivity hard metal composition.

15. The low thermal conductivity hard metal composition of claim 14, wherein the tungsten carbide is present in an amount between about 35 and about 40 weight percent.

16. The low thermal conductivity hard metal composition of claim 14, wherein the titanium carbide is present in an amount between about 30 to about 45 weight percent.

17. The low thermal conductivity hard metal composition of claim 14, wherein the titanium carbide is present in an amount of about 35 to about 40 weight percent.

18. The low thermal conductivity hard metal composition of claim 14, wherein the low thermal conductivity hard metal composition has a hardness of at least 88 HRA.

19. The low thermal conductivity hard metal composition of claim 14, wherein the cobalt comprises from about 6 to about 15 weight percent of the low thermal conductivity hard metal composition.

* * * * *